United States Patent
Cao et al.

(10) Patent No.: US 10,778,392 B2
(45) Date of Patent: Sep. 15, 2020

(54) PILOTS FOR WIRELESS ACCESS IN VEHICULAR ENVIRONMENTS

(71) Applicant: Marvell World Trade Ltd., St. Michael (BB)

(72) Inventors: Rui Cao, Fremont, CA (US);
Hongyuan Zhang, Fremont, CA (US);
Xiayu Zheng, San Jose, CA (US);
Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/386,319

(22) Filed: Apr. 17, 2019

(65) Prior Publication Data

US 2019/0334674 A1    Oct. 31, 2019

Related U.S. Application Data

(60) Provisional application No. 62/663,168, filed on Apr. 26, 2018.

(51) Int. Cl.
| | |
|---|---|
| *H04L 5/00* | (2006.01) |
| *H04W 4/40* | (2018.01) |
| *H04W 72/04* | (2009.01) |

(52) U.S. Cl.
CPC ............ *H04L 5/0048* (2013.01); *H04W 4/40* (2018.02); *H04W 72/0453* (2013.01)

(58) Field of Classification Search
CPC .... H04L 5/0048; H04W 4/40; H04W 72/0453
See application file for complete search history.

(56) References Cited

U.S. PATENT DOCUMENTS

| | | |
|---|---|---|
| 6,115,354 A | 9/2000 | Weck |
| 6,721,294 B1 | 4/2004 | Bahrenburg et al. |

(Continued)

FOREIGN PATENT DOCUMENTS

| | | |
|---|---|---|
| EP | 1643669 A1 | 4/2006 |
| EP | 3474482 A1 | 4/2019 |

OTHER PUBLICATIONS

IEEE Standard 802.11p, "IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments", pp. 1-51, Jun. 2010.
IEEE Standard 802.11a (2003), "IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band", pp. 1-92, Jun. 2003.

(Continued)

*Primary Examiner* — Duc C Ho

(57) ABSTRACT

A method for communication over a wireless interface between transceivers that are moving with respect to each other. The method includes transmitting, by a communication station (STA) in a moving vehicle over a wireless channel to a receiver outside the vehicle, a sequence of data symbols encoded in accordance with a frequency-domain multiplexing scheme extending over a range of sub-carrier tones. A condition affecting the wireless channel is evaluated. Responsively to the evaluated condition, a pilot scheme is selected from among a plurality of available pilot schemes, for interleaving of pilot signals in specified sub-carrier tones of the data symbols. An indication of the selected pilot scheme is exchanged between the STA and the receiver. The pilot signals are interleaved in the transmitted data symbols in accordance with the selected pilot scheme.

18 Claims, 3 Drawing Sheets

(56) References Cited

U.S. PATENT DOCUMENTS

| | | | |
|---|---|---|---|
| 8,175,123 B2 * | 5/2012 | Vrcelj | H04L 25/0216 |
| | | | 370/324 |
| 8,867,653 B2 | 10/2014 | Zhang et al. | |
| 8,942,311 B2 | 1/2015 | Zhang et al. | |
| 9,119,186 B2 | 8/2015 | Zhang et al. | |
| 9,246,738 B2 | 1/2016 | Zhang et al. | |
| 2012/0020434 A1 * | 1/2012 | Callard | H04L 5/005 |
| | | | 375/296 |
| 2012/0236971 A1 | 9/2012 | Taghavi Nasrabadi et al. | |
| 2012/0289274 A1 | 11/2012 | Matsuo et al. | |
| 2012/0327871 A1 | 12/2012 | Ghosh et al. | |
| 2013/0077463 A1 | 3/2013 | Zhang | |
| 2013/0128807 A1 | 5/2013 | Vermani et al. | |
| 2013/0286961 A1 | 10/2013 | Vermani et al. | |
| 2015/0256304 A1 | 10/2015 | Porat | |
| 2016/0013908 A1 | 1/2016 | Porat | |
| 2016/0112547 A1 | 4/2016 | Porat | |
| 2016/0119452 A1 | 4/2016 | Lee | |
| 2016/0205677 A1 | 7/2016 | Kim et al. | |
| 2016/0366699 A1 | 12/2016 | Zhang et al. | |
| 2018/0233996 A1 | 8/2018 | Zhu et al. | |
| 2018/0359066 A1 | 12/2018 | Mu et al. | |
| 2020/0037385 A1 | 1/2020 | Park et al. | |

OTHER PUBLICATIONS

Cao et al. U.S. Appl. No. 16/179,320, filed Nov. 2, 2018.

IEEE P802.11-REVmcTM/D8.0, "IEEE P802.11-REVmcTM/D8.0, Draft Standard for Information technology—Telecommunications and information exchange between systemsLocal and metropolitan area networks—Specific requirements Part 11: Wireless LAN Medium Access Control (MAC) and Physical Layer (PHY) Specifications", pp. 1-3774, Aug. 2016.

Porat et al., "Travelling Pilots", doc.: IEEE 802.11-12/1322r0, pp. 1-16, Nov. 12, 2012.

Ritt, "On pilot patterns in MIMO OFDMA transmissions in E-UTRA", 3GPP TSG RAN WG 1 # 42, R1-050786, London, UK, pp. 1-6, Aug. 29-Sep. 2, 2005.

International Application No. PCT/IB2019/053184 search report dated Jul. 17, 2019.

Zhang et al., "802.11 for Next Generation V2X Communication", IEEE draft 802.11-18/0513r2, pp. 1-29, Mar. 6, 2018.

IEEE Std 802.1AX™, "IEEE Standard for Local and metropolitan area networks—Link Aggregation", pp. 1-163, Nov. 3, 2008.

U.S. Appl. No. 16/179,320 office action dated Apr. 30, 2020.

* cited by examiner

PILOTS FOR WIRELESS ACCESS IN VEHICULAR ENVIRONMENTS

CROSS-REFERENCE TO RELATED APPLICATION

This application claims the benefit of U.S. Provisional Patent Application 62/663,168, filed Apr. 26, 2018, which is incorporated herein by reference.

FIELD OF THE INVENTION

The present invention relates generally to communication networks, and particularly to methods and apparatus for data communications in a vehicular environment.

BACKGROUND

Data communications to and from traveling vehicles have attracted increasing attention in the communication and automotive industries. This attention has led to the development of the IEEE 802.11p amendment to the 802.11 wireless local area network (WLAN) family of standards. IEEE 802.11p was defined to add wireless access in vehicular environments (WAVE), and specifies enhancements to the basic 802.11 standard that are useful in supporting Intelligent Transportation System (ITS) applications.

The physical layer (PHY) of IEEE 802.11p uses the frame format and data encoding scheme that were specified originally by IEEE 802.11a, based on orthogonal frequency-domain multiplexing (OFDM). A frame in this context is referred to as a PHY protocol data unit (PPDU). The PPDU format defined in section 17.3.2 of IEEE Draft Standard IEEE P802.11REVmc™/D8.0 (August 2016) includes predefined pilot signals inserted by the transmitting PHY in sub-carriers −21, −7, 7 and 21, out of a total of 52 sub-carriers in each OFDM symbol. The receiving PHY detects and processes these known pilot signals for the purpose of common phase estimation and compensation (CPE/C).

The use of "traveling pilots" has been proposed as an alternative pilot scheme for OFDM communications, in place of schemes in which pilot signals are inserted in a fixed set of sub-carriers. For example, U.S. Patent Application Publication 2016/0013908 describes a scheme in which pilot tones occupy fewer than all tone locations in any given symbol, and the pilot tones occupy different respective locations within different symbols. Generally, these traveling pilots are assigned to different respective tone locations in different symbols. In total, the pilot tones do not cover every single tone location within the symbols used to convey information between devices. Considering for example, when pilots occupy fewer than all tone locations, even among multiple symbols, a device may perform interpolation to generate a pilot tone estimate corresponding to a tone location not occupied by pilot tone within any symbol.

SUMMARY

Embodiments of the present invention that are described hereinbelow provide improved methods and apparatus for communications, particularly in vehicular environments.

There is therefore provided, in accordance with an embodiment of the invention, a method for communication over a wireless interface between transceivers that are moving with respect to each other. The method includes transmitting, by a communication station (STA) in a moving vehicle over a wireless channel to a receiver outside the vehicle, a sequence of data symbols encoded in accordance with a frequency-domain multiplexing scheme extending over a range of sub-carrier tones. A condition affecting the wireless channel is evaluated. Responsively to the evaluated condition, a pilot scheme is selected from among a plurality of available pilot schemes, for interleaving of pilot signals in specified sub-carrier tones of the data symbols. An indication of the selected pilot scheme is exchanged between the STA and the receiver. The pilot signals are interleaved in the transmitted data symbols in accordance with the selected pilot scheme.

In some embodiments, selecting the pilot scheme includes choosing the pilot scheme from among a set of the pilot schemes including at least first and second pilot schemes having different, respective first and second densities of the specified sub-carrier tones in which the pilot signals are interleaved. In a disclosed embodiment, the first and second densities of the specified sub-carrier tones are both greater than 10%.

Additionally or alternatively, selecting the pilot scheme includes choosing the pilot scheme from among a set of the pilot schemes specifying different, respective patterns of traveling pilots. Each such pattern defines, for a sequence containing a specified number of the data symbols, a succession of different sets of the sub-carrier tones in which the pilot signals are to be interleaved in each of the data symbols in the sequence. In a disclosed embodiment, one or more of the patterns of traveling pilots are defined such that over all of the data symbols in the sequence of the data symbols, the pilot signals are incorporated in all of the sub-carrier tones. Additionally or alternatively, choosing the pilot scheme includes selecting the pilot scheme from among at least first and second pilot schemes having different, respective first and second densities of the specified sub-carrier tones in which the pilot signals are interleaved in the data symbols in the sequence. Further additionally or alternatively, choosing the pilot scheme includes selecting the pilot scheme from among at least first and second pilot schemes having different, respective first and second numbers of the data symbols in the sequence in which the sets of the sub-carrier tones pilot signals are interleaved.

In some embodiments, evaluating the condition includes assessing a frequency coherence over the range of the sub-carrier tones. Additionally or alternatively, evaluating the condition includes assessing a speed of movement of the vehicle relative to the receiver.

There is also provided, in accordance with an embodiment of the invention, apparatus for communication over a wireless interface between transceivers that are moving with respect to each other. The apparatus includes a transceiver configured to be deployed in a moving vehicle and to transmit over a wireless channel to an access point outside the vehicle a sequence of data symbols encoded in accordance with a frequency-domain multiplexing scheme extending over a range of sub-carrier tones. Control logic includes a radio condition evaluator module, which is configured to evaluate a condition affecting the wireless channel. A pilot scheme selector module is configured to select, responsively to the evaluated condition, a pilot scheme, from among a plurality of available pilot schemes, for interleaving of pilot signals in specified sub-carrier tones of the data symbols, and to exchange an indication of the selected pilot scheme between the STA and the receivers. A pilot symbol interleaver module is configured to interleave the pilot signals in the transmitted data symbols in accordance with the selected pilot scheme.

The present invention will be more fully understood from the following detailed description of the embodiments thereof, taken together with the drawings in which:

DETAILED DESCRIPTION OF EMBODIMENTS

Figure 1:
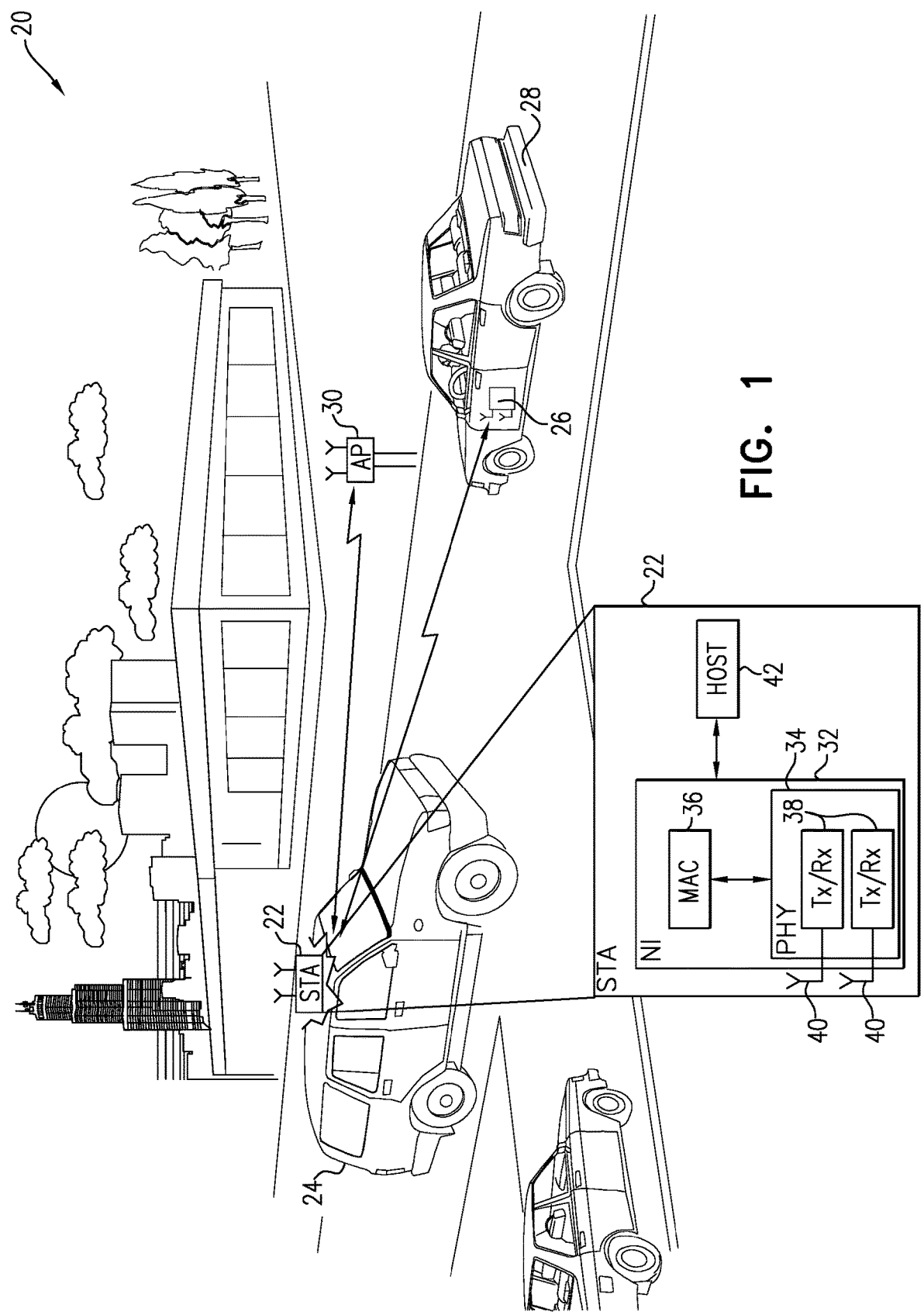
FIG. 1 is a schematic, pictorial illustration of a communication system, in accordance with an embodiment of the invention.

WAVE applications create challenges for data communications that do not exist in ordinary WLAN environments. For example, when a communication station (STA) in a moving vehicle transmits data to a target receiver, such as another vehicle or a fixed access point (AP), channel conditions can change rapidly, and Doppler frequency shifts can be significant. When the STA is traveling at moderate speed and transmits only short data packets, it may be sufficient to estimate and update the CPE/C once per packet. As WAVE applications become more sophisticated, however, longer packets are needed to achieve a high data throughput. As vehicle speed and packet length increase, the need arises to detect and handle changes in channel conditions that occur even in the course of transmitting a single packet.

Embodiments of the present invention address these problems by interleaving of pilot tones within each symbol in a frequency-domain multiplexing scheme, such as the sort of OFDM scheme that is used in WAVE communications. In some embodiments, the interleaving is "dense," in the sense that the pilot tones are incorporated in every symbol in a PHY data frame, with a density of at least 10%, and possibly 20% or more. (The "density" in this context means the fraction of the sub-carrier tones that carry pilot signals.) in some embodiments, the density of pilot tones is selectable, for example in response to a sensed channel condition requiring greater pilot density or permitting lesser pilot density. Some embodiments provide patterns of traveling pilots, meaning that over a sequence of data symbols, the pilot signals are interleaved in a different set of sub-carrier tones in each data symbol in the sequence. In an implementation, patterns of traveling pilots are defined such that over the sequence of the data symbols, the union of the different sets of sub-carrier tones that contain pilot signals in each of the data symbols in the sequence covers all of the sub-carrier tones.

The disclosed pilot schemes enable the receiver to estimate and regularly update its estimate of the channel conditions at all of the sub-carrier frequencies, and thus facilitate communications at higher symbol rates. The increased pilot density, however, comes at the expense of a reduction in the number of sub-carriers in each symbol that are available to encode actual user data. To increase the overall data throughput, it is desirable that the STA be able to choose the pilot scheme that achieves an optimal tradeoff between the symbol rate and the amount of data encoded by each symbol.

Some embodiments of the present invention address this need by defining a set of multiple pilot schemes. Each such scheme specifies a different interleaving of pilot signals in the sub-carrier tones of the data symbols in each PHY data frame. The pilot schemes may include traveling pilot schemes, as well as dense, static pilot schemes. One of these schemes is chosen for each data frame depending on conditions affecting the wireless channel, such as vehicle speed and/or frequency coherence, for example. Other channel conditions that may have an impact on the choice of pilot scheme include, for example, multi-path effects, weather, and interference. The choice of pilot scheme may be made independently by the STA or on the basis of information provided by the receiver, according to any suitable decision criteria. The information and decision criteria will vary depending on application requirements and operating environment.

The STA and its target receiver (such as another STA or an AP) exchange an indication of the selected pilot scheme, for example by setting certain predefined bits in the preamble of each PHY data frame. The STA then proceeds to interleave the pilot signals in the transmitted data symbols in accordance with the selected scheme.

For the sake of concreteness and clarity, the description below refers specifically to selection and use of pilots schemes in transmission from a mobile communication station (STA) in a vehicle to a target receiver, which may be moving or stationary. The principles of the present invention may likewise be applied, mutatis mutandis, to transmissions from a fixed transmitter, such as an AP, to a moving receiver. All such alternative embodiments and implementations are considered to be within the scope of the present invention.

FIG. 1 is a schematic, pictorial illustration of a communication system 20, in accordance with an embodiment of the invention. In the pictured scenario, a STA 22 in a moving vehicle 24 communicates with one or more target receivers. For example, STA 22 may communicate with a peer STA 26 in another vehicle 28, and/or with fixed roadside infrastructure, such as an access point (AP) 30. Although the description that follows relates specifically to transmissions of data from STA 22 to a target receiver, in practice the communications in system 20 are bidirectional, meaning that STA 26 and AP 30 may transmit data to STA 22 using the same methods and principles.

As shown in the inset in FIG. 1, STA 22 comprises a network interface (NI) 32, which comprises PHY and medium access control (MAC) interfaces 34 and 36, in accordance with the IEEE 802.11 specifications. PHY interface 34 comprises one or more radio transceivers 38, which are connected to antennas 40. In the pictured embodiment, PHY interface 34 comprises two such transceivers, each with its own antenna. Alternatively, larger or smaller numbers of transceivers and antennas may be used, with one or more antennas connected to each transceiver. The internal construction of STA 26 and AP 30 may be similar to that of STA 22. Typically, the components of PHY and MAC interfaces 34 and 36 are implemented in dedicated or programmable hardware logic circuits, on a single integrated circuit chip or a set of two or more chips.

A host processor 42 passes data to network interface 32 for transmission over the air to target receivers, and receives incoming data from network interface 32. Host processor 42 typically comprises a microprocessor, along with a suitable memory and other resources (not shown), and is programmed in software or firmware to carry out various control and communication functions in STA 22. The software may be stored in tangible, non-transitory computer-readable media, such as a suitable RAM or ROM memory. Host processor 42 may be implemented together with the elements of network interface 32 in a single system-on-chip (SoC), or as a separate chip or chip set.

The components of STA 22 that are involved in encoding, decoding and framing data transmitted and received by transceivers 38, including setting parameters, such as the pilot scheme, used in such operations, are referred to collectively herein as "control logic." The control logic typically includes both host 42 and components of network interface 32.

When host processor 42 conveys outgoing data to network interface 32, MAC interface 36 encapsulates the outgoing data in MAC-layer data frames, referred to as MAC protocol data units (MPDUs). MAC interface 36 passes these MPDUs to PHY interface 34, which encapsulates them in physical-layer data frames (PPDUs, as noted above). The data are encoded in each PPDU as a sequence of data symbols in accordance with a frequency-domain multiplexing scheme extending over a range of sub-carrier tones, for example the OFDM scheme specified by IEEE 802.11p. PHY interface 34 also interleaves pilot signals in specified sub-carrier tones of the data symbols, as described hereinbelow.

Further aspects of an example implementation of STA 22 and AP 30 are described in U.S. patent application Ser. No. 16/179,320, filed Nov. 2, 2018, whose disclosure is incorporated herein by reference. Specifically (although not exclusively), the features of the access point and client that are shown in FIG. 1 and described in paragraphs 0021-0037 of U.S. patent application Ser. No. 16/179,320 may similarly be incorporated in system 20. Features that are not essential to an understanding of the present invention are omitted from the present description for the sake of brevity.

Figure 2:
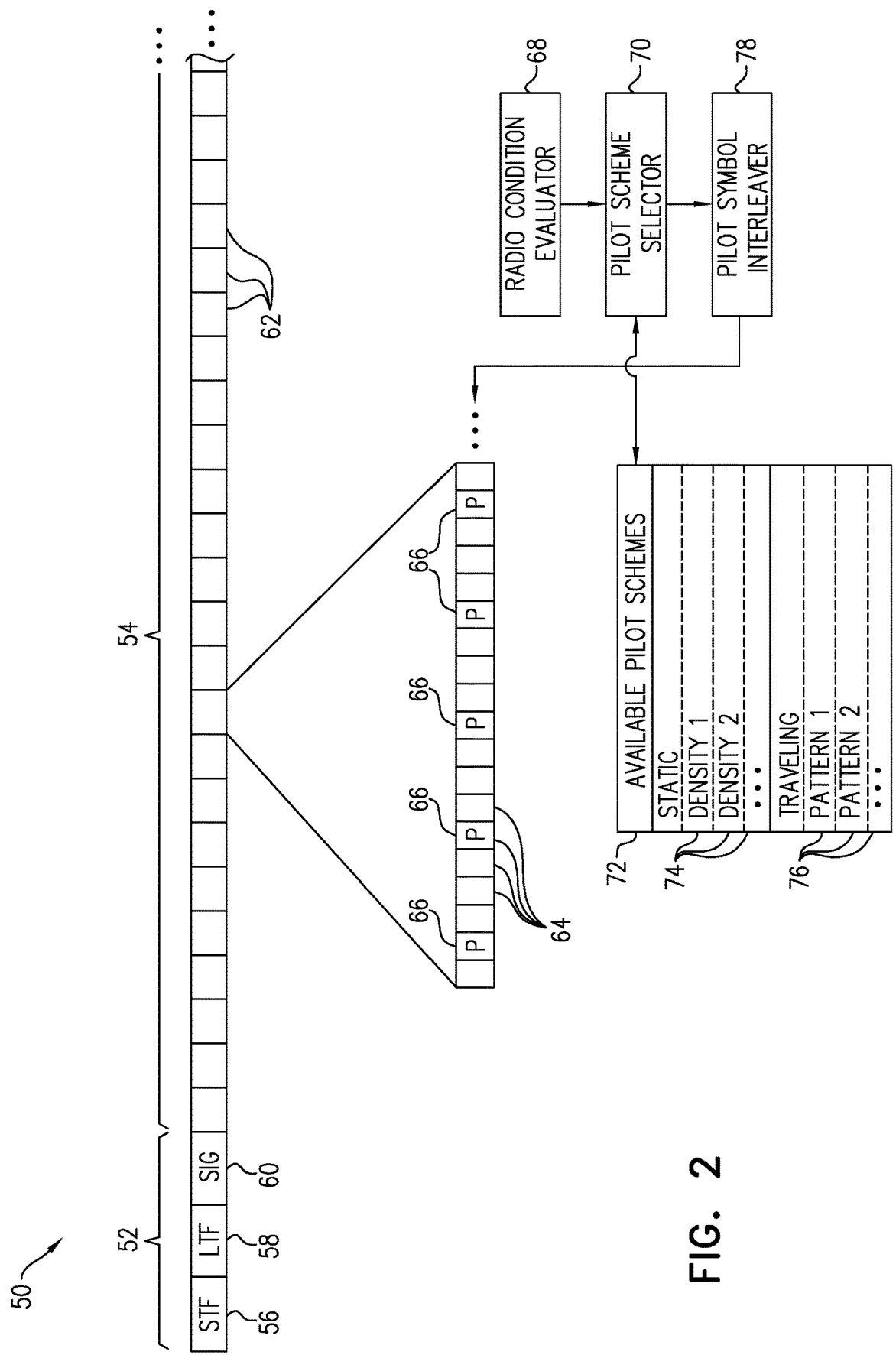
FIG. 2 is a block diagram that schematically illustrates a data frame with interleaved pilot signals, along with associated communication logic and data structures in accordance with an embodiment of the invention.

FIG. 2 is a block diagram that schematically illustrates a PHY data frame (PPDU) 50 with interleaved pilot signals, along with associated communication logic and data structures, in accordance with an embodiment of the invention. PPDU 50 comprises a preamble 52, followed by a data portion 54, in accordance with the applicable IEEE standard.

In this simplified example, preamble 52 comprises a short training field (STF) 56, followed by a long training field (LTF) 58. These fields are used in the receiver for packet detection, synchronization, and initial channel estimation. A signal field 60 contains one or more data symbols comprising PHY encoding parameters, such as the length of data portion 54 and coding rate. In addition, in the present embodiment, signal field 60 contains one or more bits signaling the pilot scheme that is to be used in data portion. For example, one bit may be used as a flag to indicate whether a static pilot scheme or traveling pilot scheme is to be used, followed by one or more addition bits indicating the choice of pilot density or traveling pilot pattern, selected from a list of predefined options. The communication logic and data structures that are used in choosing and applying the pilot scheme are described further hereinbelow.

Data portion 54 contains a sequence of OFDM symbols 62, each encoding a certain quantity of data, which depends on the encoding scheme and choice of OFDM numerology. Details of a suitable encoding process are shown, for example, in FIG. 7 of the above-mentioned U.S. patent application Ser. No. 16/179,320 and are described with reference thereto in paragraphs 0058-0081. Each OFDM symbol comprise multiple sub-carrier tones 64, for example fifty-two tones.

In accordance with the pilot scheme that is indicated in signal field 60, PHY interface 34 incorporates pilot signals in specified sub-carrier tones 66, which are also referred to as pilot tones or pilot sub-carriers. The pilot signals comprise predefined sequences of bits, which are chosen so that they can be easily and unequivocally decoded by the receiver. Such pilot signals are defined, for example, in section 17.3.5.10 of the above-mentioned IEEE P802.11REVmc™/D8.0 standard, which is incorporated herein by referenced. Alternatively, any other suitable pilot signals can be used in tones 66.

In the example shown in FIG. 2, pilot signals are inserted in every fourth tone in each symbol 62, such as in tones ±2, ±6, ±10, ±14, ±18, ±22 and ±26. As another example, pilot signals may be inserted in every fifth tone, such as in tones ±1, ±6, ±11, ±16, ±21 and ±26. Further alternatively, other schemes with higher or lower pilot density may be used.

Upon receiving each symbol 62 in frame 50, the receiver decodes pilot tones 66 in order to update its estimates of channel properties at each of the corresponding sub-carrier frequencies. The receiver interpolates between these estimates in order to find approximate channel properties for use in decoding the data in the neighboring sub-carrier tones 64. The accuracy of the interpolated estimates will generally increase with the density of the pilot tones. When the channel is characterized by low frequency coherence (or equivalently, fast fading), for example due to Doppler and multi-path effects, the channel properties will vary rapidly from one sub-carrier to the next. In this case, a denser pilot scheme may be favored to increase the accuracy of channel estimation. Alternatively, when fading is slow, a sparser pilot scheme (with density below 20%, for example) may be used to increase the number of sub-carrier tones that are available to encode data.

In another embodiment, pilot tones 66 vary from symbol to symbol 62 according to a traveling pilot scheme. Each such scheme defines a succession of different sets of sub-carrier tones 64 in which pilot signals are to be interleaved in successive data symbols 62 over a sequence of the data symbols. In other words, each pattern of traveling pilots defines, for a sequence containing a specified number of data symbols, a succession of different sets of the sub-carrier tones in which the pilot signals are to be interleaved in each of the data symbols in the sequence. One or more (or all) of the patterns of traveling pilots may be defined such that over all of the data symbols in each such sequence, the pilot signals are incorporated in all of the sub-carrier tones.

An example of this sort of scheme is shown below in Table I. In this scheme, seven different patterns of eight pilots each (labeled P0, P1, . . . , P7) repeat cyclically in different sub-carrier tones over sequences of seven successive symbols over the length of data portion 54:

TABLE I

TRAVELING PILOTS

| Pilot index: | Sequence index: | | | | | | |
|---|---|---|---|---|---|---|---|
| | 0 | 1 | 2 | 3 | 4 | 5 | 6 |
| P0 | −28 | −24 | −26 | −22 | −25 | −23 | −27 |
| P1 | −21 | −17 | −19 | −15 | −18 | −16 | −20 |
| P2 | −14 | −10 | −12 | −8 | −11 | −9 | −13 |
| P3 | −7 | −3 | −5 | −1 | −4 | −2 | −6 |
| P4 | 1 | 5 | 3 | 7 | 4 | 6 | 2 |
| P5 | 8 | 12 | 10 | 14 | 11 | 13 | 9 |
| P6 | 15 | 19 | 17 | 21 | 18 | 20 | 16 |
| P7 | 22 | 26 | 24 | 28 | 25 | 27 | 23 |

Thus, over any sequence of seven symbols, a pilot signal will be transmitted in each one of the fifty-six sub-carrier tones used in the present encoding scheme.

Alternatively, other traveling pilot schemes with different densities of pilot tones and/or different numbers of data symbols in the sequence over which the traveling pilots repeat, may be used to cover the same set of fifty-six sub-carrier tones. For example, fourteen different patterns of four pilot tones may be used to cover the fifty-six sub-carrier tones over a cycle of fourteen successive symbols. Further alternatively, other traveling pilot schemes, which may or may not cover all of the sub-carrier tones, may be used. The optimal choice of scheme, as in the case of static pilot tones described above, depends on the number of sub-carrier tones in the OFDM numerology and the channel conditions.

In order to select the optimal pilot scheme to use in each case, a radio condition evaluator module 68 evaluates conditions affecting the wireless channel. In response to the evaluated condition, a pilot scheme selector module 70 selects a pilot scheme, for example from a list 72 of available pilot schemes held in a memory of STA 22. List 72 may include both static schemes 74, having different respective pilot densities, and traveling pilot schemes 76, having different, respective patterns of pilots that extend over respective sequences of data symbols. Traveling pilot schemes 76 may have different, respective pilot densities, and the respective sequences may contain different, respective numbers of data symbols, as explained above. A pilot symbol interleaver module 78 then interleaves the pilot signals in the sub-carrier tones of the data symbols for transmission by STA 22 as indicated by the selected pilot scheme.

Modules 68, 70 and 78 are typically implemented in hardware logic within network interface 22 (FIG. 1). Additionally or alternatively, at least some of the elements of radio condition evaluator module 68 and pilot scheme selector module 70 may be implemented in software running on host processor 42. Further additionally or alternatively, at least a part of the functions of modules 68 and 70 may be carried out by the target receiver, for example in peer STA 26 or in AP 30. All such implementations are considered to be within the scope of the present invention.

Figure 3:
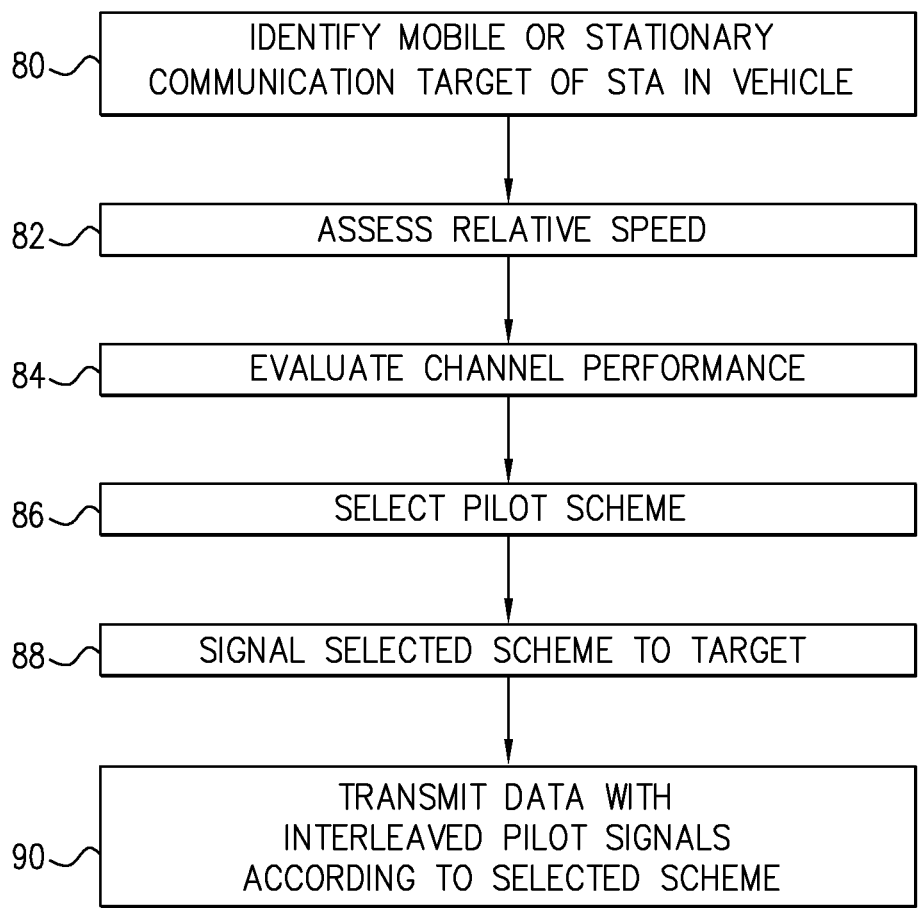
FIG. 3 is a flow chart that schematically illustrates a method for transmitting data with interleaved pilot signals, in accordance with an embodiment of the invention.

FIG. 3 is a flow chart that schematically illustrates a method for transmitting data with interleaved pilot signals, in accordance with an embodiment of the invention. The method is described here, for the sake of concreteness and clarity, with reference to the elements of system 20 (FIG. 1), and particularly of STA 22. The principles of this method may similarly be implemented, however, by the other elements of system 20, as well as in other systems that support wireless data communications with and between moving vehicles.

STA 22 identifies a target receiver with which to communicate, at a target identification step 80. The target may be either mobile, such as STA 26, or stationary, such as AP 30. In order to select the pilot scheme to use in communicating with the target receiver, STA 22 evaluates conditions affecting the wireless channel to the target receiver. As part of this evaluation, STA 22 assesses the speed of vehicle 24 relative to the target receiver. For this purpose, for example, host 42 may receive an input from another element, such as the speedometer, a Global Positioning System (GPS) receiver, or another suitable device for determining relative speed, in vehicle 24. Alternatively or additionally, host 42 may estimate the speed based on signals received by STA 22 from the target receiver or from other transmitters in the vicinity of vehicle 24. The Doppler shift of signals transmitted by STA 22 will increase as the speed of vehicle 24 increases, thus necessitating greater pilot density or implementation of other schemes to mitigate the effects of fading.

Additionally or alternatively, STA 22 estimates channel characteristics of the communication channel to the target receiver, at a channel performance evaluation step 84. This evaluation may be based on processing and channel estimation of signals received by STA 22 from the target receiver. Host 42 evaluates the channel conditions that are relevant to selection of the pilot scheme, such as the frequency coherence, as noted above, as well as other fading characteristics. Additionally or alternatively, components of the network infrastructure, such as AP 30, may broadcast information concerning channel conditions, and STA 22 may receive and use this information at step 84.

Based on the results of step 82 and/or step 84, STA 22 selects a pilot scheme, at a scheme selection step 86. The selection may be based, for example, on processing of speed and/or channel performance information by host 42. Alternatively or additionally, the target receiver may collect and process information from steps 82 and 84, and then transmit an indication of the desired pilot scheme features (such as the pilot density) to STA 22.

In any case, PHY interface 34 signals the choice of pilot scheme to the target receiver, at a signaling step 88. This signaling can be carried out by setting the appropriate bits in signal field 60, as described above, to indicate whether the pilot scheme is static or traveling, and to set the density of pilot tones that is to be used. Alternatively, other means of signaling can be used. PHY interface 34 then proceeds to encode the data for transmission, with pilot signals interleaved in sub-carrier tones 66 in accordance with the selected scheme, at a data transmission step 80.

When STA 22 transmits a large volume of data to the target receiver, the data may be spread over two or more PPDUs. In this case, STA may repeat steps 82-90 in order to update the selected pilot scheme in the course of the transmission.

It is noted that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication over a wireless interface between transceivers that are moving with respect to each other, comprising:

transmitting, by a communication station (STA) in a moving vehicle over a wireless channel to a receiver outside the vehicle, a sequence of data symbols encoded in accordance with a frequency-domain multiplexing scheme extending over a range of sub-carrier tones;

evaluating a condition affecting the wireless channel;

responsively to the evaluated condition, selecting a pilot scheme, from among a plurality of available pilot schemes, for interleaving of pilot signals in specified sub-carrier tones of the data symbols;

exchanging an indication of the selected pilot scheme between the STA and the receiver; and interleaving the pilot signals in the transmitted data symbols in accordance with the selected pilot scheme.

2. The method for communication according to claim 1, wherein selecting the pilot scheme comprises choosing the pilot scheme from among a set of the pilot schemes including at least first and second pilot schemes having different, respective first and second densities of the specified sub-carrier tones in which the pilot signals are interleaved.

3. The method for communication according to claim 2, wherein the first and second densities of the specified sub-carrier tones are both greater than 10%.

4. The method for communication according to claim 1, wherein selecting the pilot scheme comprises choosing the pilot scheme from among a set of the pilot schemes specifying different, respective patterns of traveling pilots, each such pattern defining, for a sequence containing a specified number of the data symbols, a succession of different sets of the sub-carrier tones in which the pilot signals are to be interleaved in each of the data symbols in the sequence.

5. The method for communication according to claim 4, wherein one or more of the patterns of traveling pilots are defined such that over all of the data symbols in the sequence of the data symbols, the pilot signals are incorporated in all of the sub-carrier tones.

6. The method for communication according to claim 4, wherein choosing the pilot scheme comprises selecting the pilot scheme from among at least first and second pilot schemes having different, respective first and second densities of the specified sub-carrier tones in which the pilot signals are interleaved in the data symbols in the sequence.

7. The method of communication according to claim 4, wherein choosing the pilot scheme comprises selecting the pilot scheme from among at least first and second pilot schemes having different, respective first and second numbers of the data symbols in the sequence in which the sets of the sub-carrier tones pilot signals are interleaved.

8. The method for communication according to claim 1, wherein evaluating the condition comprises assessing a frequency coherence over the range of the sub-carrier tones.

9. The method for communication according to claim 1, wherein evaluating the condition comprises assessing a speed of movement of the vehicle relative to the receiver.

10. Apparatus for communication over a wireless interface between transceivers that are moving with respect to each other, comprising:
a transceiver configured to be deployed in a moving vehicle and to transmit over a wireless channel to an access point outside the vehicle a sequence of data symbols encoded in accordance with a frequency-domain multiplexing scheme extending over a range of sub-carrier tones; and
control logic, which comprises:
a radio condition evaluator module, which is configured to evaluate a condition affecting the wireless channel;
a pilot scheme selector module, which is configured to select, responsively to the evaluated condition, a pilot scheme, from among a plurality of available pilot schemes, for interleaving of pilot signals in specified sub-carrier tones of the data symbols, and to exchange an indication of the selected pilot scheme between the STA and the receivers; and
a pilot symbol interleaver module, which is configured to interleave the pilot signals in the transmitted data symbols in accordance with the selected pilot scheme.

11. The apparatus for communication according to claim 10, wherein the pilot scheme selector module is configured to choose the pilot scheme from among a set of the pilot schemes including at least first and second pilot schemes having different, respective first and second densities of the specified sub-carrier tones in which the pilot signals are interleaved.

12. The apparatus for communication according to claim 11, wherein the first and second densities of the specified sub-carrier tones are both greater than 10%.

13. The apparatus for communication according to claim 10, wherein the pilot scheme selector module is configured to choose the pilot scheme from among a set of the pilot schemes specifying different, respective patterns of traveling pilots, each such pattern defining, for a sequence containing a specified number of the data symbols, a succession of different sets of the sub-carrier tones in which the pilot signals are to be interleaved in each of the data symbols in the sequence.

14. The apparatus for communication according to claim 13, wherein one or more of the patterns of traveling pilots are defined such that over all of the data symbols in the sequence of the data symbols, the pilot signals are incorporated in all of the sub-carrier tones.

15. The apparatus for communication according to claim 13, wherein the pilot scheme selector module is configured to select the pilot scheme from among at least first and second pilot schemes having different, respective first and second densities of the specified sub-carrier tones in which the pilot signals are interleaved in the data symbols in the sequence.

16. The apparatus for communication according to claim 13, wherein the pilot scheme selector module is configured to select the pilot scheme from among at least first and second pilot schemes having different, respective first and second numbers of the data symbols in the sequence in which the sets of the sub-carrier tones pilot signals are interleaved.

17. The apparatus for communication according to claim 10, wherein the condition evaluated by the radio condition evaluator module comprises a frequency coherence over the range of the sub-carrier tones.

18. The apparatus for communication according to claim 10, wherein the condition evaluated by the radio condition evaluator module comprises a speed of movement of the vehicle relative to the receiver.

* * * * *